US012728846B2

(12) United States Patent
Clawson et al.

(10) Patent No.: US 12,728,846 B2
(45) Date of Patent: Sep. 8, 2026

(54) SYSTEMS AND METHODS FOR CONTROLLING AN AUTONOMOUS VEHICLE

(71) Applicant: Zoox, Inc., Foster City, CA (US)

(72) Inventors: Taylor Scott Clawson, Hyde Park, UT (US); Joseph Thomas Gannon, Pittsburgh, PA (US); Giacomo Zavolta Taylor, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 18/988,634

(22) Filed: Dec. 19, 2024

(65) Prior Publication Data

US 2026/0175835 A1 Jun. 25, 2026

(51) Int. Cl.

| | |
|---|---|
| ***B60W 60/00*** | (2020.01) |
| ***B60W 30/095*** | (2012.01) |
| ***G01S 13/931*** | (2020.01) |
| ***G08G 1/16*** | (2006.01) |

(52) U.S. Cl.

CPC .... *B60W 30/0956* (2013.01); *B60W 60/0015* (2020.02); *G01S 13/931* (2013.01); *G08G 1/16* (2013.01); *B60W 2420/403* (2013.01); *B60W 2420/408* (2024.01); *G01S 2013/9318* (2020.01)

(58) Field of Classification Search

None

See application file for complete search history.

(56) References Cited

U.S. PATENT DOCUMENTS 12,485,882 B1 * 12/2025 Wang .................... B60W 30/09
2016/0375901 A1 12/2016 Di et al.
2020/0086855 A1 * 3/2020 Packer .................. G08G 1/161
2020/0150665 A1 * 5/2020 Refaat ............... B60W 30/0956
2021/0191404 A1 * 6/2021 Blake ................ B60W 60/0011
2021/0370921 A1 * 12/2021 Silva ................ B60W 60/0027
2022/0105959 A1 * 4/2022 Hartnett ........... B60W 50/0097

(Continued)

FOREIGN PATENT DOCUMENTS

CN 113561992 A 10/2021
CN 119116949 A 12/2024

OTHER PUBLICATIONS

International Search Report and Written Opinion dated May 7, 2026 for International PCT Application No. PCT/US2025/059958.

(Continued)

*Primary Examiner* — Ryan Rink

(74) *Attorney, Agent, or Firm* — EIP US LLP

(57) ABSTRACT

A system and method for selecting a trajectory to traverse comprises receiving a primary trajectory, determining, based at least in part on the primary trajectory, a primary area traversed by the sensor platform in accordance with the primary trajectory and a secondary area traversed by the sensor platform in accordance with a contingent trajectory, and determining, based at least in part on a sensor associated with the sensor platform, that an object is located at least partly within a combined area comprising the primary and secondary area. Upon determining that an object is in the combined area, determining, based at least in part on the object being located at least partly within the combined area, a probability of a collision with the object; and controlling, based at least in part on the determined probability of collision, the sensor platform.

17 Claims, 6 Drawing Sheets

(56) References Cited

U.S. PATENT DOCUMENTS

| | | | | |
|---|---|---|---|---|
| 2023/0099853 | A1* | 3/2023 | Mangas | B60T 7/22 |
| 2023/0122617 | A1* | 4/2023 | Bradley | B60W 60/0011 701/26 |
| 2023/0347880 | A1* | 11/2023 | Clawson | G06V 20/58 |
| 2024/0075923 | A1* | 3/2024 | Kassar | B60W 60/0027 |
| 2024/0149868 | A1* | 5/2024 | Packer | B60W 60/00276 |
| 2024/0157976 | A1* | 5/2024 | Heo | B60W 30/0956 |
| 2024/0253668 | A1 | 8/2024 | Spielberg et al. | |
| 2025/0381977 | A1* | 12/2025 | Ma | B60W 50/14 |
| 2026/0057773 | A1* | 2/2026 | Beaurepaire | G08G 1/166 |

OTHER PUBLICATIONS

Chen, Yuxiao et al., "ScePT: Scene-consistent, Policy-based Trajectory Predictions for Planning", arXiv:2206.13387v1, Jun. 18, 2022, pp. 1-12, retrieved from the internet [URL: https://arxiv.org/pdf/2206.13387]. pp. 1-8, 11 and figures 1-10.

* cited by examiner

SYSTEMS AND METHODS FOR CONTROLLING AN AUTONOMOUS VEHICLE

BACKGROUND

Systems, such as autonomous vehicles, are programmed with safety in mind, in addition to other goals, such as predictability, responsiveness, and, in the case of autonomous vehicles, passenger comfort. In certain situations, such as where an object intersects a trajectory of such an autonomous vehicle, the vehicle may be programmed to avoid an adverse safety outcome. Collision avoidance systems are used in autonomous vehicles, designed to detect and prevent potential collisions with other vehicles, pedestrians, or obstacles. These systems use a combination of sensors, cameras, radar, and LiDAR to gather real-time environmental data, enabling the vehicle to identify hazards and make rapid decisions to avoid adverse safety outcome. These systems can trigger actions such as braking, steering adjustments, or acceleration to navigate safely around hazards. Redundancy and fail-safe mechanisms are also essential to ensure reliability under diverse conditions. Key challenges include ensuring accuracy in adverse weather, minimizing false positives, and handling ethical dilemmas, such as prioritizing different types of hazards. As technology advances, collision avoidance systems continue to improve in precision, making autonomous vehicles safer and more reliable.

BRIEF DESCRIPTION OF DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
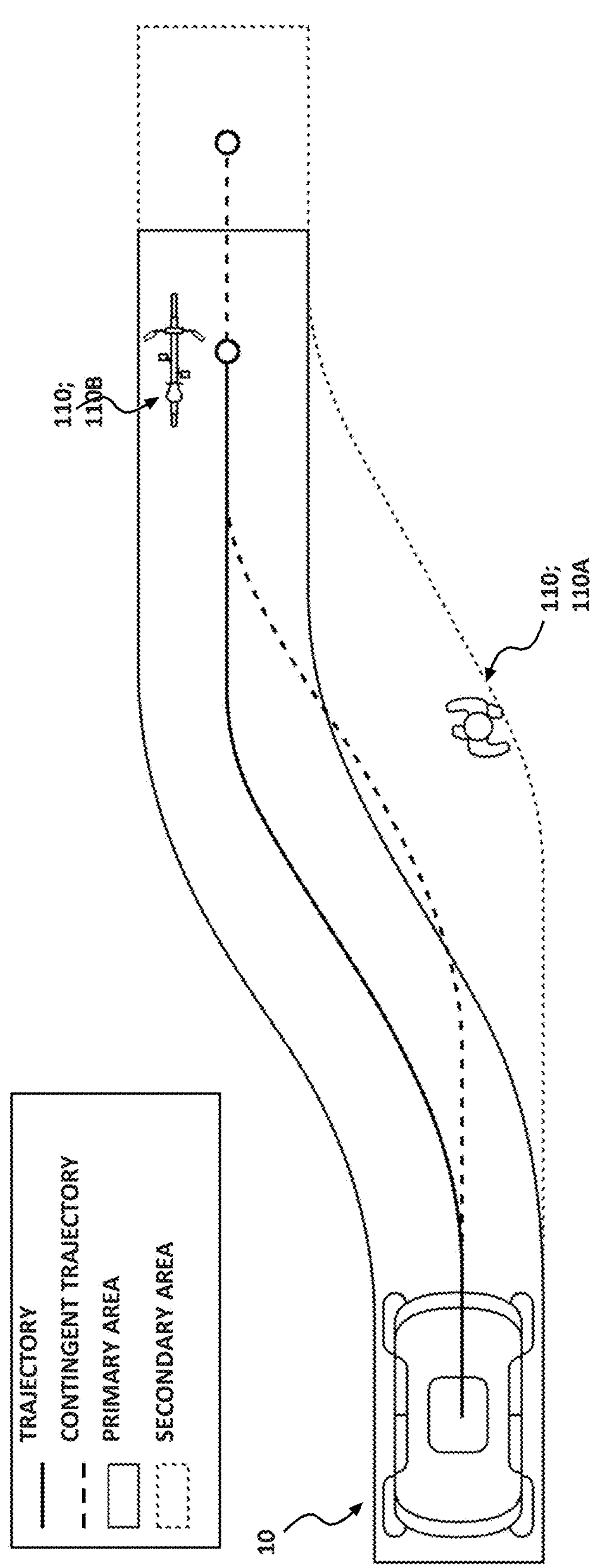
FIG. 1 is a top view of an autonomous vehicle traversing an environment, in accordance with examples of the disclosure.

This disclosure describes systems, methods, and computer-readable media for avoiding and/or mitigating collisions of a sensor platform while the sensor platform is traversing through an environment along a planned path. The sensor platform may be a vehicle, such as a driverless vehicle, such as an autonomous vehicle (AV), or a driver-controlled vehicle. In one or more examples herein, the sensor platform obtains a set of trajectories for the sensor platform to traverse through the environment. The set of trajectories may comprise one or more trajectories. The set of trajectories may comprise a nominal trajectory corresponding to a planned path that the sensor platform is expected to follow during its operation, and optionally a set of additional trajectories that the sensor platform may choose to follow. The trajectories may be seen as optional paths to take from any given position on the nominal trajectory. Based on the plurality of obtained trajectories the sensor platform may determine an area, such as a proximity buffer, associated with the plurality of trajectories to monitor for objects. The sensor platform monitors, using one or more sensors, the environment associated with the determined area associated with the plurality of trajectories and outputs information about the environment of the sensor platform to a system, such as a system for avoiding an adverse safety outcome, of the sensor platform. The sensor platform may perform criteria checks on the obtained optional trajectories and performs collision avoidance based on these criteria checks. In one or more examples, the criteria checks comprise checking a probability of collision and/or a collision severity score for the plurality of optional trajectories. The collision avoidance may be performed by outputting an optimal trajectory to execute to a controller of the sensor platform, wherein the optimal trajectory is a trajectory having the lowest determined probability of collision and/or collision severity score.

In one or more examples, obtaining the plurality of trajectories may comprise receiving a trajectory, such as a primary (nominal) trajectory, to traverse through the environment. The primary trajectory may be one or more of swerving left, proceeding straight ahead, or swerving right, and/or performing a deceleration, such as a maximum deceleration. The sensor platform determines, based at least in part on the primary trajectory, a primary area traversed by the sensor platform in accordance with the primary trajectory. The sensor platform may further determine, based at least in part on the primary trajectory, a contingent trajectory and a secondary area associated with the contingent trajectory. The primary area may be an area swept by the sensor platform upon the vehicle executing the primary trajectory. Correspondingly, the secondary area may be an area swept by the sensor platform upon the sensor platform executing the contingent trajectory. In one or more examples, a plurality of primary trajectories may be received. In one or more examples, plurality of contingent trajectories may be determined based on the plurality of primary trajectories.

In one or more examples, the primary trajectory is a trajectory associated with taking an action at a current time. In one or more examples, the contingent trajectory is associated with taking the action at a future time after the current time, such as in a next processing instant, such as in a next tick, of the sensor platform. In one or more examples, the contingent trajectory may comprise performing a maximum deceleration. For example, if the primary trajectory is executing a right swerve, then the corresponding contingent trajectory may be waiting, such as following the nominal trajectory, for another time instance, such as a tick, and then executing the right swerve.

While traversing through the environment, the sensor platform monitors the combined area and determines, based at least in part on a sensor associated with the sensor platform, whether an object is likely to be located at least partly within the combined area comprising the primary and secondary area. An object being likely to be located at least partly within the combined area can herein be seen as the object being located in, at least partly located in, or likely to be located in the combined area at a later time. The combined area may herein also be referred to as a proximity buffer. Upon determining, that the combined area is free from objects the sensor platform is controlled to proceed traversing along a current path for another processing instant. A decision to use extra processing for determining actions for collision avoidance can thus be avoided until and object is likely to be at least partly located within the combined area.

Upon determining, that an object is likely to be at least partly within the combined area, a probability of a collision with the object is determined. Determining the probability of collision may be conditional upon an object being at least partly within the combined area. Stated differently, if there is no object within the combined area, a probability of collision does not have to be determined. By making the determination of the probability of collision conditional upon an object being at least partly within the combined area, computational resources may be saved since a collision check is not required to be performed for all possible trajectories, such as the set of primary trajectories and/or the set of contingent trajectories. A probability of collision may be determined for the trajectories, such as for the set of primary trajectories, such as for each of the trajectories in the set of primary trajectories respectively. In other words, the primary trajectories may have respective associated probabilities, such as probability scores, of collision. The comparison of the probability of collision might be used to prevent an execution of a trajectory that has a predicted collision with any object, such as an agent or obstacle, with a "time-to-collision" value less than or equal to a "time-to-last-second-braking" value. A trajectory that contains any expected collision that is not avoidable should not be followed; or upon all of the available trajectories having expected collisions, the trajectory that has the lowest collision severity score might be the trajectory to execute.

Upon determining that the combined area is free from objects, the sensor platform may proceed without determining a probability of collision and/or a collision severity score for another tick. Since the collision probability determination is only performed upon an object being detected in the combined area, a collision check of current versions, such as executed at a current tick, and future versions, such as executed at a future tick, of the same trajectory can be performed simultaneously and with minimal latency impact. Furthermore, by not performing a collision check on every trajectory, only on trajectories associated with a detected object, the computational resources or latency budget required for the collision check can be reduced. By reducing computational resources used, the sensor platform can allocate its capacity more strategically to prioritize safety-critical tasks, improve responsiveness, maintain reliability, and handle unexpected challenges effectively. These benefits collectively enhance the overall safety and trustworthiness of the sensor platform.

In one or more examples, the probability of collision of the trajectories in the set of primary trajectories are compared. An optimal trajectory having the lowest probability of collision and/or lowest collision severity score for the sensor platform may further be determined, based at least on the comparison of the probabilities of collision for the set of primary trajectories.

Once the probabilities of collision have been determined, the traversing of the sensor platform through the environment is controlled, based at least in part on the determined probability of collision. In one or more examples, the sensor platform is controlled to traverse the optimal trajectory, such as the trajectory out of the set of primary trajectories having the lowest probability of collision and/or lowest collision severity score.

The optimal trajectory may in one or more examples be the trajectory out of the set of primary trajectories having a zero probability of collision. In case all of the primary trajectories have a probability of collision equal to or greater than a threshold probability, such as when a collision is determined to be imminent for all of the trajectories in the set of primary trajectories, a collision severity score for the set of primary trajectories, such as for may be determined. The collision severity score may be indicative of a severity of collision.

In one or more examples, the optimal trajectory may be determined using a cascaded decision logic, as will be described in further detail in the following.

In a first cascade layer, it is determined whether it is safe to proceed along the planned path, such as along the nominal trajectory, for another processing instant, such as another tick. In one or more examples, it is determined to be safe to proceed for another processing instant upon the combined area being free from obstacles, such as when an object is unlikely to be located in the combined area. In one or more examples, it may be determined safe to proceed along the planned path upon the primary area and at a secondary area, such as at least one of the contingent trajectories in the set of contingent trajectories, being free from obstacles. In other words, this means estimating how risky it would be to proceed along the currently traversed path, such as the nominal trajectory, for a small period of time, such as a tick, and then select the safest of any number of available trajectories from that future point in time. If it is determined that a collision is imminent, the selection logic may be cascaded to a second cascade level in which a collision is avoided.

In the second cascade layer, such as upon determining that a collision is imminent if the sensor platform proceeds along the planned path for another tick, such as when an object is located in the secondary area, avoiding actions may be taken by executing a trajectory out of the set of primary trajectories that avoids a collision. This may for example be done by executing a first primary trajectory out of the set of primary trajectories, such as immediately executing the primary trajectory, and optionally initiating a maximum deceleration. As such, since the trajectory is guaranteed to be collision-free for an additional period of time (e.g., a tick), a decision whether to initiate a contingent trajectory or safety action may be delayed which may result in a change of the environment such that no collisions take place in the future. In case a collision cannot be avoided, such as when all available trajectories of the set of primary trajectories are in collision, the decision logic may be cascaded to a third cascade level.

In the third cascade layer, an imminent collision may be mitigated. In one or more examples, the collision is mitigated by selecting the primary trajectory out of the set of primary trajectories that best mitigates all collisions, such as the primary trajectory having the lowest collision severity score. In one or more examples, such as upon determining that a collision is imminent in both the primary area and the secondary area, avoiding actions may be taken by executing a maximum deceleration and selecting the primary trajectory out of the set of primary trajectories having the lowest collision severity score.

The method and the system disclosed herein thus allows a postponement of any corrective actions for as long as possible without waiting so long that a collision is imminent. As long as a planning function, such as a primary trajectory manager, of the system can wait one more tick and still stop in time, then the collision is not imminent. Waiting as long as possible before taking corrective actions can optimize safety, efficiency, and passenger comfort of the sensor platform, since premature, abrupt and/or unnecessary actions can be avoided, predictability of the sensor platform's movement can be maintained for other road users. By postponing any corrective actions, such as a determination of a collision probability or a collision severity score, until an object is likely to be at least partly within the combined area, the computational resources or latency budget required for the collision check can be reduced. By reducing the computational resources and the latency budget, the sensor platform can allocate its capacity more strategically to prioritize safety-critical tasks, improve responsiveness, maintain reliability, and handle unexpected challenges effectively. These benefits collectively enhance the overall safety and trustworthiness of the sensor platform.

As used in this disclosure, a sensor platform may be any configuration of vehicle, such as, for example, a van, a sport utility vehicle, a cross-over vehicle, a truck, a bus, an agricultural vehicle, and a construction vehicle. The vehicle 100 may be powered by one or more internal combustion engines, one or more electric motors, hydrogen power, any combination thereof, and/or any other suitable power sources. Although the example vehicle 100 comprises four wheels, the systems and methods described herein may be incorporated into vehicles having fewer or greater numbers of wheels, tires, and/or tracks.

As used in this disclosure, a tick, such as a time management (TM) tick, refers to a discrete unit of time used in a system's, such as the sensor platform's, control and decision-making processes. The tick acts as a fundamental time step for updating the sensor platform's software modules, such as sensor data processing, path planning, and actuation commands. The tick may ensure that all components of the sensor platform operate in harmony, with data collected, processed, and acted upon within a consistent timeframe. The tick further facilitates a real-time nature of decision-making by defining how often the sensor platform recalculates its path, processes sensor inputs, or updates its environment model, and provides a framework for predictable and reliable execution of algorithms, crucial for maintaining safety. A length of the tick may depend on the system's design and requirements. For example, a short tick (such as every 10 ms) might be required for safety-critical tasks like collision avoidance requiring high-speed updates, while longer ticks (such as 100 ms or more) may suffice for less time-sensitive processes, like high-level navigation decisions.

As used in this disclosure, the term swept area generally refers to the total space that sensor platform, such as the vehicle potentially, occupies or affects during its movement through an environment, and optionally comprising a buffer area going beyond the space that sensor platform occupies.

As used herein, the term trajectory generally refers to a path that the sensor platform may follow while traversing through an environment. Examples of determining a collision probability are discussed in, for example, U.S. patent application Ser. No. 18/204,097 titled "Vehicle Trajectory Tree Structure Including Learned Trajectories" and filed May 31, 2023, which is incorporated by reference herein in its entirety for all purposes.

As used herein, the term collision probability generally refers to a probability, such as a likelihood, that an object will intersect a trajectory of the sensor platform. Examples of determining a collision probability are discussed in, for example, U.S. patent application Ser. No. 17/552,656, titled "Dynamic Threshold Determination for Collision Avoidance" and filed Dec. 16, 2021, which is incorporated by reference herein in its entirety for all purposes.

As used herein, the term collision severity score generally refers to an indication, such as a measure of the severity of an adverse safety outcome, such as a collision. Determining the collision severity score may comprise quantifying an impact or a seriousness of a collision. The collision severity score can be used to prioritize safety interventions, guide policy decisions, or evaluate an effectiveness of safety measures.

FIG. 1 illustrates a top view of an example sensor platform 10 which is traversing through an environment. The sensor platform 10 receives a set of primary trajectories to traverse through the environment. In the example shown in FIG. 1, the set of primary trajectories is illustrated by a first primary trajectory being indicated by the solid line. However, the set may comprise a plurality of primary trajectories. In the example scenario depicted in FIG. 1, the primary trajectory corresponds to a left swerve of the sensor platform 10. Based on the received set of primary trajectories, a set of contingent trajectories is determined, the contingent trajectory being indicated by the dashed line in FIG. 1. The set of contingent trajectories may correspond to the received set of primary trajectories but executed later, such as at a later processing instant of the vehicle, such as at a subsequent tick. In other words, the contingent trajectory corresponds to the trajectory the vehicle 10 would follow if it would wait to a later time before executing the received primary trajectory. In the example scenario of FIG. 1, the set of contingent trajectories is illustrated by a first contingent trajectory. The first contingent trajectory corresponds to the left swerve of the first primary trajectory when the left swerve is executed in the next processing instant, such as in the next tick.

Based at least in part on the set of primary trajectories and the set of contingent trajectories, a set of primary areas traversed by the sensor platform 10 in accordance with the set of primary trajectories and a set of secondary areas traversed by the sensor platform 10 in accordance with the set of contingent trajectories is determined. In the example scenario shown in FIG. 1, the set of primary areas is illustrated by a first primary area. The first primary area may comprise the swept area, such as a hero polygon, of the sensor platform 10 upon following the first primary trajectory. A hero polygon herein, represents an area swept by the sensor platform while traversing a given trajectory. The primary area may, optionally, include a collision buffer. The collision buffer may represent a region which must be guaranteed to be unobstructed to guarantee a trajectory free of adverse safety outcomes. The collision buffer may be based on factors such as an allowable tracking error, localization error, and perception errors. A hero polygon may be generated for each point on a given trajectory representing the sensor platform's 10 geometry at that point plus any region occupied by the collision buffer. Correspondingly, in FIG. 1 the set of secondary areas is illustrated by a first secondary area. The first secondary area may correspond to the swept area, such as the hero polygon, of the sensor platform 10 upon following the first contingent trajectory.

The secondary area, which may herein also be seen as the primary trajectory's proximity buffer, may comprise at a minimum the region swept by the sensor platform 10 if the primary trajectory was selected on the next tick rather than the current tick, such as if the contingent trajectory is selected rather than the primary trajectory. The second area may however encompass a superset of that region, which provides a way of configuring how early the system, such as the system for avoiding an adverse safety outcome, should intervene.

The set of primary areas and the set of secondary areas may be combined into a combined area for the sensor platform 10 to monitor for objects. In other words, the combined area may be a superset of the secondary area and the primary area. The combined area may thus encompass the set of primary areas that the vehicle would pass through if the set of primary trajectories would be executed immediately and the set of secondary areas that the vehicle would pass through if it waited, for example to a next processing instant, to execute the set of primary trajectories. The combined area may herein also be referred to as a proximity buffer. The proximity buffer, which may comprise both lateral and longitudinal components, represents a safety margin that the sensor platform 10, such as the system for avoiding an adverse safety outcome of the sensor platform 10, should leave between the sensor platform and objects whenever possible. An intersection of the combined area, such as the proximity buffer, of the sensor platform 10, may herein be referred to as a violation of the proximity buffer, or a proximity violation. A violation of the proximity buffer may not necessarily indicate a predicted collision on the checked trajectory. Instead, a proximity violation of an area, such as a proximity buffer associated with a trajectory, indicates that an adverse safety outcome on that trajectory is likely if the sensor platform, such as the system for avoiding an adverse safety outcome of the sensor platform, waits to select the trajectory until a later time, such as until a future tick. Put differently, the proximity buffer may indicate a decreasing safety margin between the sensor platform 10 and the object 110, that is expected to drop below an acceptable threshold if the sensor platform 10 waits to select the trajectory.

While traversing through the environment, the sensor platform 10 monitors the combined area, using one or more sensors associated with the sensor platform 10, to determine whether an object is likely to be located at least partly within the combined area, such as is located at least partly within or is likely to enter the combined area at a later time if the object proceeds along its current trajectory. As long as it is determined that an objects is unlikely to be located within the combined area, no additional considerations are taken and the sensor platform is controlled in accordance with the nominal trajectory. In other words, no additional computations are performed to determine a probability of collision or a severity of collision. This reduces the computational resources and the latency budget required for the sensor platform to traverse the environment.

Upon determining that an object is, at least partly, within the combined area, the sensor platform 10 determines a probability of collision with the object. The probability of collision may be determined for each of the primary trajectories in the set of primary trajectories. Put differently, the sensor platform 10 may determine the probability of collision with the object 110 if the trajectories of the set of primary trajectories would be executed, respectively. If the sensor platform 10, such as the system for avoiding an adverse safety outcome of the sensor platform 10, such as a trajectory manager of the system, can wait one more tick and still stop in time, then a collision is not imminent, in other words there is no risk for an imminent collision. Upon determining that at least one of the primary areas, in the set of primary areas, such as a primary area associated with at least one of the trajectories in the set of primary trajectories, is free from an object, the vehicle may be controlled to proceed along a current path, such as the nominal trajectory, for a threshold period of time, based at least in part on at least one of the first area being free from the object.

In the example shown in FIG. 1, two objects 110, such as a first object 110A and a second object 110B, are within the combined area, such as within the proximity buffer of the sensor platform 10. The first object 110A is not currently in collision with the sensor platform 10, since the sensor platform 10 may execute the primary trajectory and/or the contingent trajectory of FIG. 1 without colliding with the first object 110A. The second object 110B is, however, within the primary area and thus in collision with the sensor platform 10, if the sensor platform executes the primary trajectory. Since the combined area is violated by the first object 110A and the second object 110B, further actions have to be taken to avoid a collision, such as determining a collision probability for the set of primary trajectories. Therefore, additional considerations must be made to ensure that a collision with the first object 110A or the second object 110B is avoided or mitigated. Since the second object 110B is located in the primary area and a collision would be imminent if the primary trajectory was executed, additional computations must be done immediately to determine an avoiding action, such as a contingent trajectory, to execute.

The sensor platform 10 may be a vehicle, such as a driverless vehicle or a driver-controlled vehicle. The vehicle may be any configuration of vehicle, such as, for example, a van, a sport utility vehicle, a cross-over vehicle, a truck, a bus, an agricultural vehicle, and a construction vehicle. The vehicle may be powered by one or more internal combustion engines, one or more electric motors, hydrogen power, any combination thereof, and/or any other suitable power sources.

Figure 2B:
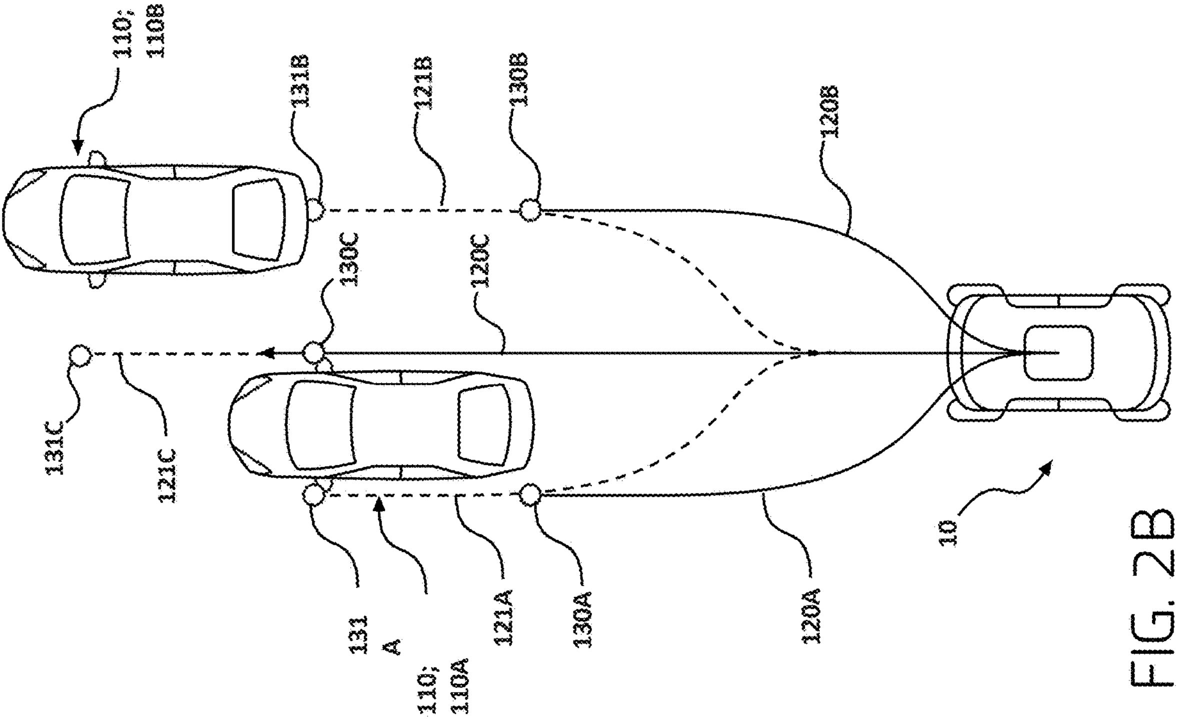
FIGS. 2A-2C are top views of an autonomous vehicle traversing different example scenarios in accordance with examples of the disclosure.
Figure 2A:
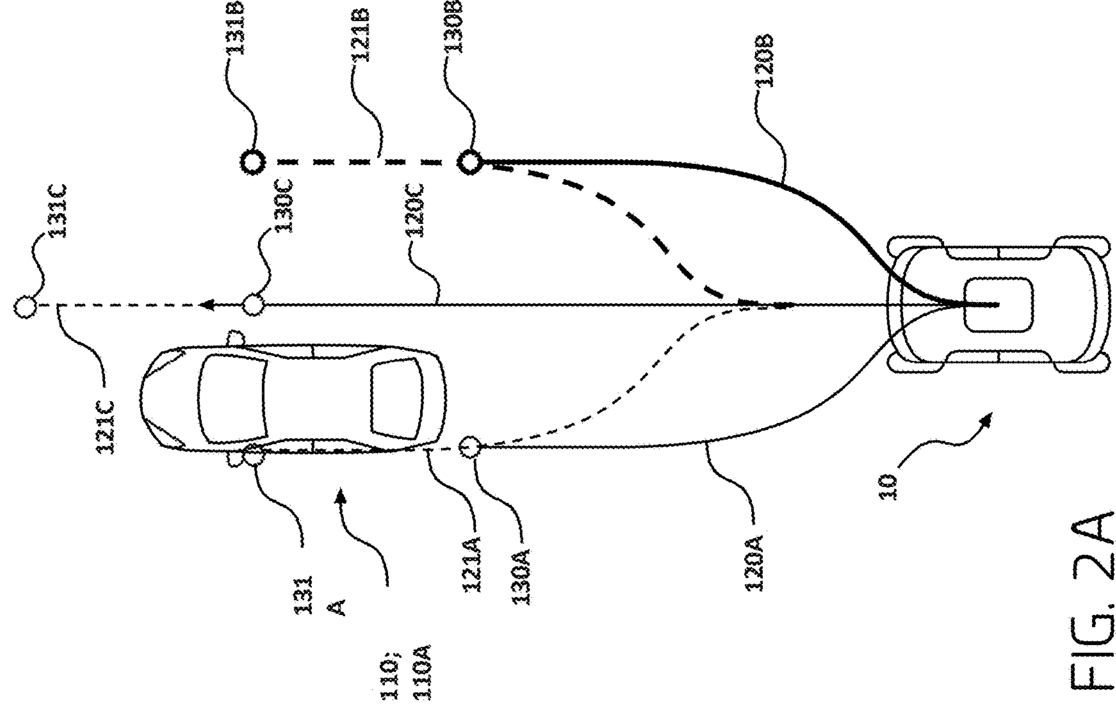
Figure 2C:
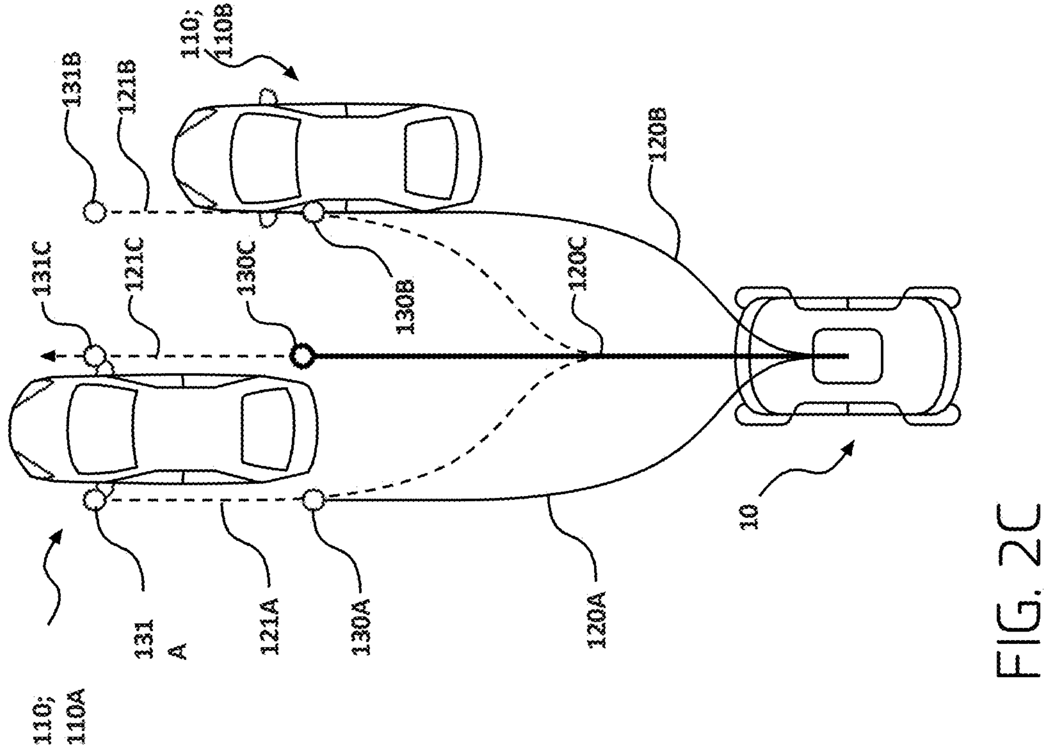

FIGS. 2A to 2C depict a selection logic for three different example scenarios according to the method disclosed herein. In the example scenarios, the sensor platform 10 traverses through the environment and receives a set of example trajectories, such as a first primary trajectory 120A, a second primary trajectory 120B, and a third primary trajectory 120C. One of the first, second and third primary trajectories may be the nominal trajectory, such as corresponding to the planned path, of the sensor platform 10. The first primary trajectory 130A comprises swerving to the left, the second primary trajectory 120B comprises swerving to the right, and the third primary trajectory 120C comprises proceeding straight ahead. Based on the set of primary trajectories, a set of contingent trajectories, such as a first contingent trajectory 121A, a second contingent trajectory 121B, and a third contingent trajectory 121C, are determined for the sensor platform 10. The first contingent trajectory 121A corresponds to the first trajectory 120A when executed at a later time, such as at the next processing instant of the sensor platform 10. Correspondingly, the second contingent trajectory 121B corresponds to the second trajectory 120B and the third contingent trajectory 121C corresponds to the third primary trajectory 120C, when executed at the later time. Each of the primary trajectories 120A-120C may have a respective stopping position 130A-130C, at which position the sensor platform 10 would come to a halt if a maximum deceleration of the sensor platform 10 would be applied while executing the respective primary trajectory. Correspondingly, each of the contingent trajectories 121A-121C may have a respective contingent stopping position 131A-131C, at which position the sensor platform 10 would come to a halt if a maximum deceleration of the sensor platform 10 would be applied while executing the respective contingent trajectory.

The sensor platform 10 may monitor, based at least in part on one or more sensors associated with the sensor platform, the combined area encompassing a set of primary areas determined based at least in part on the plurality of primary trajectories 120A-120C and a plurality of secondary areas determined based at least in part on the plurality of contingent trajectories 121A-121C. The plurality of primary areas may comprise a first primary area determined based at least in part on the first primary trajectory 120A, a second primary area determined based at least in part on the second primary trajectory 120B, and a third primary area determined based at least in part on the third primary trajectory 120C. The plurality of secondary areas may comprise a first secondary area determined based at least in part on the first contingent trajectory 121A, a second secondary area determined based at least in part on the second contingent trajectory 121B, and a third secondary area determined based at least in part on the third contingent trajectory 121C.

Upon detecting that an object 110 is within the combined area, the sensor platform 10 determines whether it can proceed along a planned trajectory or if an intervention in the planned trajectory is required.

In the example scenario shown in FIG. 2A, a first object 110A is determined to be in the combined area monitored by the sensor platform 10. The sensor platform 10 determines a probability of collision for the plurality of primary trajectories 120A-120C in the set of primary trajectories. Put differently, the sensor platform 10 may determine whether proceeding along the planned trajectory, such as the nominal trajectory, for another processing instant, such as another tick, will lead to an adverse safety outcome, such as an imminent collision. In the example scenario of FIG. 2A, executing the third primary trajectory 120C, the third contingent trajectory 121C, or the first contingent trajectory 121A would lead to an adverse safety outcome, such as a collision, between the sensor platform 10 and the first object 110A. However, executing the first primary trajectory 120A, the second primary trajectory 120B, or the second contingent trajectory 121B would avoid the adverse safety outcome. In other words, the risk of collision is zero upon executing the second the first primary trajectory 120A, the second primary trajectory 120B, or the second contingent trajectory 121B. Since at least one of the contingent trajectories, such as the second contingent trajectory 121B, is free from objects, the sensor platform 10 may determine that no intervention is required and may proceed along the nominal trajectory for another tick. In the example scenario of FIG. 2A, the third primary trajectory 120C may be the nominal trajectory, the sensor platform 10 may thus proceed along the third primary trajectory 120C for another tick.

In the example scenario shown in FIG. 2B, two objects 110, such as the first object 110A and a second object 110B, are at least partly in the combined area monitored by the sensor platform 10. Proceeding along any of the contingent trajectories, such as the first contingent trajectory 121A or the second contingent trajectory 121B would in this example lead to a collision with either the first object 110A or the second object 110B. In this scenario, a collision is imminent if the sensor platform 10 proceeds for another tick without intervening in the planned trajectory. The sensor platform 10, such as the system for avoiding an adverse safety outcome of the sensor platform 10, may determine that an intervention, such as an immediate intervention, is required to avoid a collision. The intervention may comprise determining a probability of collision for the first, second and third primary trajectories and selecting the primary trajectory which avoids a collision, such as executing the second primary trajectory 120B. Executing the second primary trajectory may comprise swerving right and performing maximum deceleration of the sensor platform 10.

In the example scenario shown in FIG. 2C, the first object 110A is in the same position as in the scenario of FIG. 2B. The second object 110B, however, is located closer to the sensor platform 10 than in FIG. 2B. Upon determining the risk of collision, a collision is determined to be imminent regardless of the selected trajectory. Put differently, proceeding along any of the primary trajectories 120A-120C or any of the contingent trajectories 121A-121B would in this example lead to a collision with either the first object 110A or the second object 110B. An intervention may thus be required to mitigate the collision. To mitigate the collision, the sensor platform 10, such as the system for avoiding an adverse safety outcome of the sensor platform 10, may determine a collision severity score for the set of primary trajectories and may execute the trajectory out of the set of primary trajectories having the lowest collision severity score. The trajectory having the lowest collision severity score may be the trajectory that minimizes an expected collision energy or other collision metric. In the example scenario of FIG. 2C, the sensor platform may execute the third primary trajectory 120C and perform a maximum deceleration to reduce the speed of the sensor platform as much as possible before impact with the first object 110A.

Figure 3:
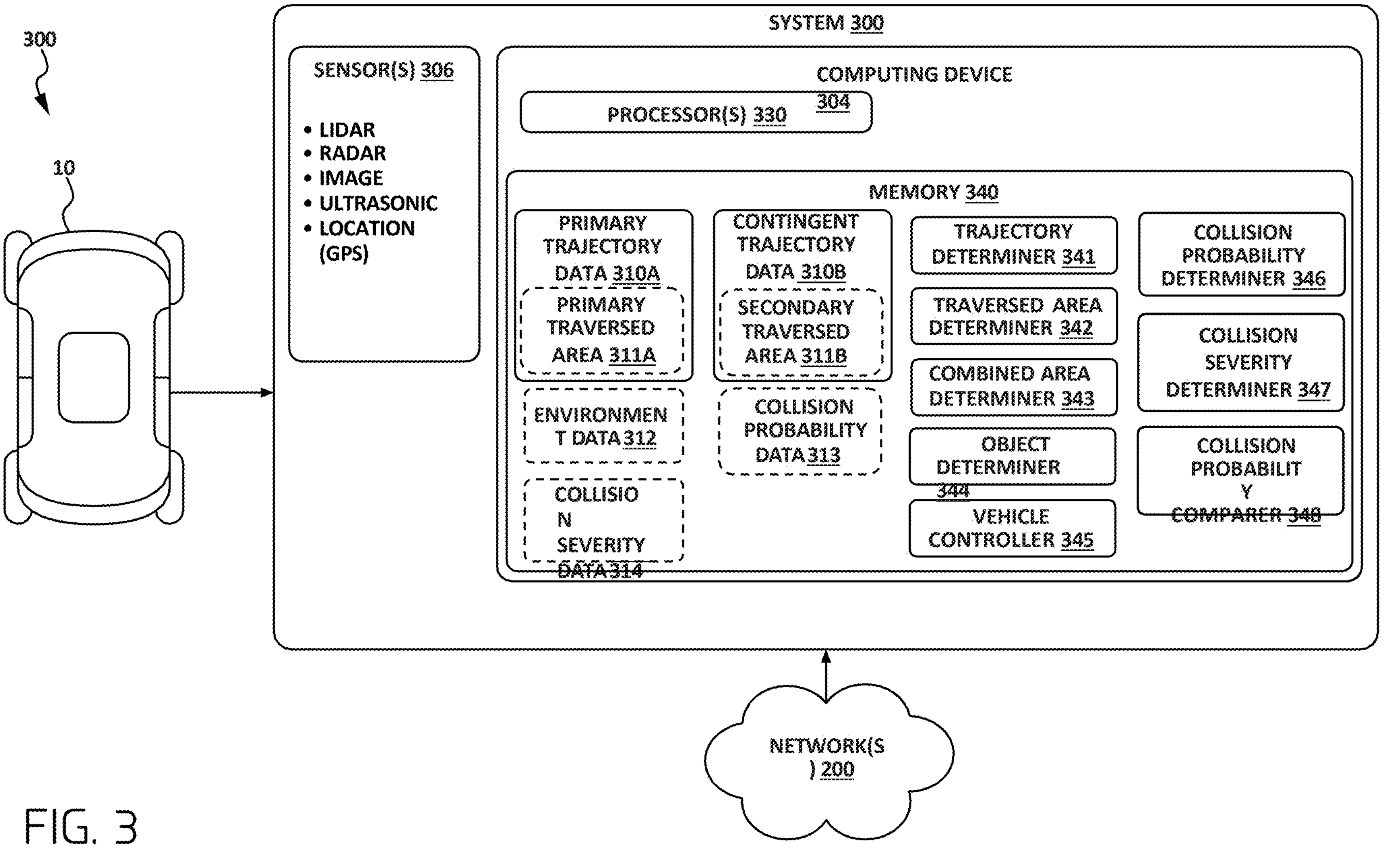
FIG. 3 is a schematic diagram illustrating an example implementation for determining a combined area to monitor and controlling the vehicle in accordance with examples of the disclosure.

FIG. 3 depicts a block diagram of an example system 300 for implementing the techniques described herein. Although some not specifically mentioned on reference to the example system 300 of FIG. 3, the system 300 of FIG. 3 may be adapted to provide any feature, functionality or effect described herein. In one or more examples, the system 300 is a system for avoiding an adverse safety outcome.

The system 300 may be integrated in a sensor platform 10, such as a vehicle, such as an AV, as presented herein. However, the system 300 may in some examples be remote from the sensor platform 10 and operatively connected to the sensor platform 10. In some examples, the system 300 may be partly integrated in the sensor platform 10 and partly remote from the sensor platform 10. In other words, the system 300 may be a distributed system 300.

The system 300 comprises or is operatively connected to a computing device 304. The computing device 304 may be any suitable computing device 304 and comprise one or more processors 330. A processor 330 as used herein may be any suitable processor, processing circuitry, controller or control circuitry. The computing device 304 further comprises or is operatively connected to one or more memories 340. The memory 340 may comprise instructions executable by the processor(s) 330. These instructions, when executed, may cause the processor(s) to perform specific operations, functions and features. In the following, these operations, features and functions will be described in reference to the general system 300.

The system 300 may be configured with one or more trajectory determiners 341. The trajectory determiner 341 is configured to receive and/or determine trajectory data 310 of the sensor platform 10 associated with the system 300, such as primary trajectory data 310A and contingent trajectory data 310B. The primary trajectory data 310A is indicative of a set of primary trajectories for the sensor platform to traverse through the environment. The contingent trajectory data 310B is indicative of a set of contingent trajectories for the sensor platform to traverse through the environment. The contingent trajectories in the set of contingent trajectories may correspond to a respective primary trajectory out of the set of primary trajectories, such as may be one or more of swerving left, proceeding straight ahead, or swerving right, wherein the contingent trajectory is executed after the current time, such as in a next processing instant. The processing instant may herein be a time management tick of the sensor platform. The primary trajectory data 310A may be provided via one or more networks 200 or by one or more sensors 306 of the sensor platform 10 or the system 300.

The trajectory data 310, such as the primary trajectory data 310A and the contingent trajectory data 310B, may indicate one or more trajectories, such as one or more primary and/or one or more contingent trajectories, to traverse through an environment for the sensor platform 10 associated with the system 300. The trajectory data 310 may comprise spatial, temporal, and contextual information essential for understanding the vehicle's motion and surroundings. The spatial data may comprise data indicative of one or more of position coordinates (such as latitude, longitude, and altitude in geographic coordinates or x, y, z in a local coordinate system), velocity (such as speed and direction of the vehicle at each point in time), acceleration (such as changes in velocity over time, including linear and angular accelerations), a heading and/or orientation (such as a direction the vehicle is facing, often represented as yaw, pitch, and roll angles) of the sensor platform 10 associated with the system 300. The temporal data may comprise data indicative of one or more of timestamps (such as a time associated with each position to track movement over time), a duration (such as time spent on specific segments of the trajectory), a frequency of data points (such as a sampling rate of the trajectory data) associated with the trajectories. The contextual data may comprise data indicative of one or more of kinematic parameters, semantic data, localization data, or trajectory quality metrics.

The kinematic parameters may be indicative of one or more of a steering angle (such as an angle of the steering wheel during the trajectory), brake and/or throttle inputs (such as control inputs affecting the trajectory), or a yaw rate (such as a rate of change of the vehicle's heading) of the sensor platform 10 associated with the system 300.

The semantic data may be indicative of one or more of road features (such as stop signs, traffic lights, crosswalks, or speed bumps encountered along the trajectory), a path type (such as straight paths, curves, intersections, U-turns, etc.), behavioral events (such as events such as lane changes, overtaking, stopping, or yielding) associated with the trajectories.

The localization data may be indicative of one or more of map matching (such as the trajectory's alignment with a digital map), Global Navigation Satellite System (GNSS) data (such as raw GNSS readings or fused localization data), or Simultaneous Localization and Mapping data (SLAM) if used for local trajectory planning.

The trajectory quality metrics may be indicative of one or more of a smoothness (such as evaluations of abrupt changes in velocity or direction along the trajectory), an energy efficiency (such as a power or fuel consumption during the trajectory), or safety metrics (such as a clearance from obstacles, adherence to speed limits, and compliance with traffic laws).

The trajectory determiner 141 may be configured to determine the contingent trajectory data 310B for the sensor platform 10 based at least in part on the first trajectory data 310A of the sensor platform 10. The contingent trajectory data 310B may correspond to the first trajectory data 310A but differ in that a timestamp for executing the contingent trajectory data 310B is later than a timestamp for executing the primary trajectory data 310A. The contingent trajectory may thus be executed, based on the contingent trajectory data 310B, after a time, such as in a next processing instant, of the primary trajectory data 310A. The processing instant may herein be a time management tick of the sensor platform.

The system 300 may further be configured with one or more traversed area determiner 342. The traversed area determiner 342 is configured to determine a primary area traversed by the sensor platform in accordance with the primary trajectory, based at least in part on the primary trajectory data 310A. The traversed area determiner 342 is configured to determine a secondary area traversed by the sensor platform in accordance with one or more contingent trajectories, based at least in part on the contingent trajectory data 310B. The traversed area determiner may be configured to determine the primary area, and the secondary area based at least in part on sensor platform data, such as sensor platform dimension data indicative of a footprint of the sensor platform 10, stored in the memory 340. Data indicative of the primary traversed area, such as primary traversed area data 311A, may be stored in the memory 340. Data indicative of the secondary traversed area, such as primary traversed area data 311B, may be stored in the memory 340.

The system 300 may further be configured with one or more combined area determiner 343. The combined area determiner 343 and/or the traversed area determiner 342 is configured to determine a combined area comprising the primary area and the secondary area. The combined area, which may herein also be referred to as a proximity buffer, can be seen as an area that the system is to monitor for objects.

The system 300 may comprise one or more object determiners 344. The object determiner 344 may be configured to determine, based at least in part on one or more of the sensors 306, whether an object is at least partly within the combined area comprising the primary and the secondary area. The object determiner 344 may be configured to receive environment data 312 from the one or more sensors 306. The one or more sensors 306 may be configured to monitor the environment, such as measure, detect or otherwise obtain relevant environment data 312. The sensors 306 may be exemplified by, but not limited to one or more LIDAR sensors, radar sensors, image sensors configured to e.g., monitor an exterior of the vehicle 10, location sensors (e.g., GPS, GNSS etc.) configured to e.g., detect a location of the vehicle 10, etc. The data from the sensors 106 may be combined, otherwise processed, to provide the environment data 312. For instance, the object determiner 344 in a sensor platform 10 may use sensor data from radar, lidar, cameras, and/or ultrasonic sensors, to identify potential hazards. Radar and lidar sensor data 106 provide distance and object detection, image sensors, such as cameras, offer visual recognition of the environment, and ultrasonic sensors handle close-range detection. By integrating these sensor inputs, the system 300, such as the object determiner 344, can detect violations of the combined area, such as of a proximity buffer, of the sensor platform 10 and may issue timely warnings or initiate execution of alternative trajectories to prevent collisions.

The environment data 312 may comprise perception data indicative of one or more of sensor fusion outputs (such as data from lidar, radar, cameras, and ultrasonic sensors about the environment around the vehicle) and detected objects (such as classification, position, velocity, and trajectory predictions for the objects).

The environment data 312 may further comprise environmental context data indicative of one or more of traffic data (such as information about nearby vehicles, pedestrians, or cyclists along the trajectory), obstacles (such as detected objects or hazards along the path), road conditions (such as surface type, potholes, weather effects, etc.), or lane information (such as lane boundaries, width, and curvature) associated with the trajectories.

The system 300 may comprise one or more collision probability determiner(s) 346. The collision probability determiner 346 may be configured to determine, based at least in part on an object being located at least partly within the combined area, collision probability data 313 indicative of a probability of collision with the object for the set of primary trajectories. The collision probability data 313 may comprise a collision probability score for each of the trajectories in the set of primary trajectories. The collision probability determiner 346 may determine the collision probability based at least in part on one or more of the sensors 306 and/or one or more of the data stored in the memory 340, such as one or more of the primary trajectory data 310A, the contingent trajectory data 310B, or the environment data 312. The collision probability determiner 346 may use environment data to monitor a movement or a location of an object to determine a probability of the object intersecting any of the primary trajectories or primary areas of the sensor platform. The collision probability may be determined to be high when the object is located stationary within the primary area, or when the object is moving towards the primary area, and/or lower when the object is moving away from the primary area or is located stationary outside of the primary area. In one or more examples, the sensors 306 may comprise inertial measurement units (IMUs) monitoring dynamics of the sensor platform. The collision probability determiner 346 may consider the dynamics of the sensor platform when determining the collision probability. In one or more examples, the collision probability determiner 346 is configured to determine a probability of collision for a plurality of trajectories, such as for the trajectories indicated by the primary trajectory data 310A and/or the contingent trajectories indicated by the contingent trajectory data 310B, respectively. In other words, the collision probability determiner 346 may determine respective associated probabilities of collision for the one or more trajectories and contingent trajectories. The determined probabilities of collision may be stored as collision probability data 313 in the memory 340. In one or more examples, the collision probability determiner 346 may determine that a probability of collision is zero for a trajectory being associated with an area being free of objects and being larger than zero for a trajectory associated with an area being intersected by an object. In one or more examples, the collision probability, such as the collision probability score may be indicated as a binary number, where a 0 indicates that no probability of collision has been determined for the trajectory and a 1 indicates that a collision has been determined to be imminent for the trajectory. In one or more examples, the collision probability determiner may be configured to determine that a collision is imminent when a "time-to-collision" value is less than or equal to a "time-to-last-second-braking" value.

The system 300 may comprise one or more collision severity determiner(s) 347. The collision severity determiner 347 may be configured to determine a severity of a collision, such as a collision severity score, for the one or more primary trajectories in the set of primary trajectories. The collision severity determiner 347 may be configured to determine a first severity score for a first primary trajectory, and a second severity score for a second primary trajectory. In one or more example, the collision severity determiner 347 is configured to determine the collision severity score upon all trajectories being determined to lead to an imminent collision, such as having a probability of collision larger than zero. In one or more examples, a collision can be considered to be imminent upon a collision probability determined by the collision probability determiner 346 being larger than a collision threshold. The determined collision severity scores may be stored as collision severity data 314 in the memory 340. The collision severity determiner 347 may be configured to determine the collision severity score by analyzing an outcome of selecting the respective trajectories in the set of primary trajectories based on a set of key factors, such as injury severity, property damage, collision speed, number of involved parties, environment (such as weather conditions, road quality, visibility, and lighting at the time of the collision), type of collision (such as rear-end, head-on, side-impact, rollover, etc., being associated with different severity levels), post collision response time, etc. The collision severity score may be determined by assigning weightings to the different key factors based on its contribution to the collision severity, and optionally calculating the score based the weighted key factors using a mathematical formula, for example by using a weighted linear scoring formula.

The collision severity score can be seen as a quantitative measure used to assess a potential or actual severity of a collision in the context of the sensor platform, such as of an AV. The collision severity score may be determined by analyzing various factors that contribute to the dynamics of the collision, the entities involved, and the outcomes. The collision severity determiner 347 may determine, such as may calculate or estimate, the collision severity score based on one or more of a relative speed (such as by measuring, for example using one or more of the sensors 306, a velocity difference between the sensor platform 10 and the object (such as another car, a pedestrian, or an obstacle), where a higher relative speeds typically results in a higher collision severity score), a mass of entities (such as by estimating a mass of the involved entities (e.g., a small car vs. a heavy truck), where a larger mass difference results in a higher severity score for the smaller/lighter entity), an impact angle (such as by analyzing an angle of collision, where a head-on or side-impact collisions results in a higher severity score than glancing blows), a proximity and/or time to impact (such as by using the one or more sensors 306, e.g. LiDAR, radar, and cameras, to calculate a distance and time remaining before a collision), or an environmental context (such as by considering road conditions (wet, icy, uneven road conditions), lighting, and visibility factors, where poor road conditions, lighting and/or visibility factors result in a higher collision severity score).

The system 300 may comprise one or more collision probability comparer(s) 348. The collision probability comparer 348 may be configured to compare the probability of collision associated with the one or more primary trajectories of the set of primary trajectories. In one or more examples, the collision probability comparer 348 is configured to compare the severity scores of the one or more primary trajectories of the set of primary trajectories. In one or more examples, the collision probability comparer 348 determines, based at least on the comparison of the probabilities of collision, an optimal trajectory out of the one or more primary trajectories of the set of primary trajectories having a lowest probability of collision and/or a lowest severity score for the sensor platform 10. In other words, the collision probability comparer 348 may select a trajectory which avoids all collisions, such as a trajectory having a zero probability of collision as the optimal trajectory. In case all primary trajectories have a probability of collision higher than the collision threshold, the collision probability comparer 348 may determine that the trajectory out of the one or more primary trajectories of the set of primary trajectories having the lowest severity score is the optimal trajectory. In other words, the collision probability comparer 348 may select a trajectory out of the set of primary trajectories having the lowest severity score, in case all primary trajectories out of the set of primary trajectories lead to an imminent collision.

Figure 5:
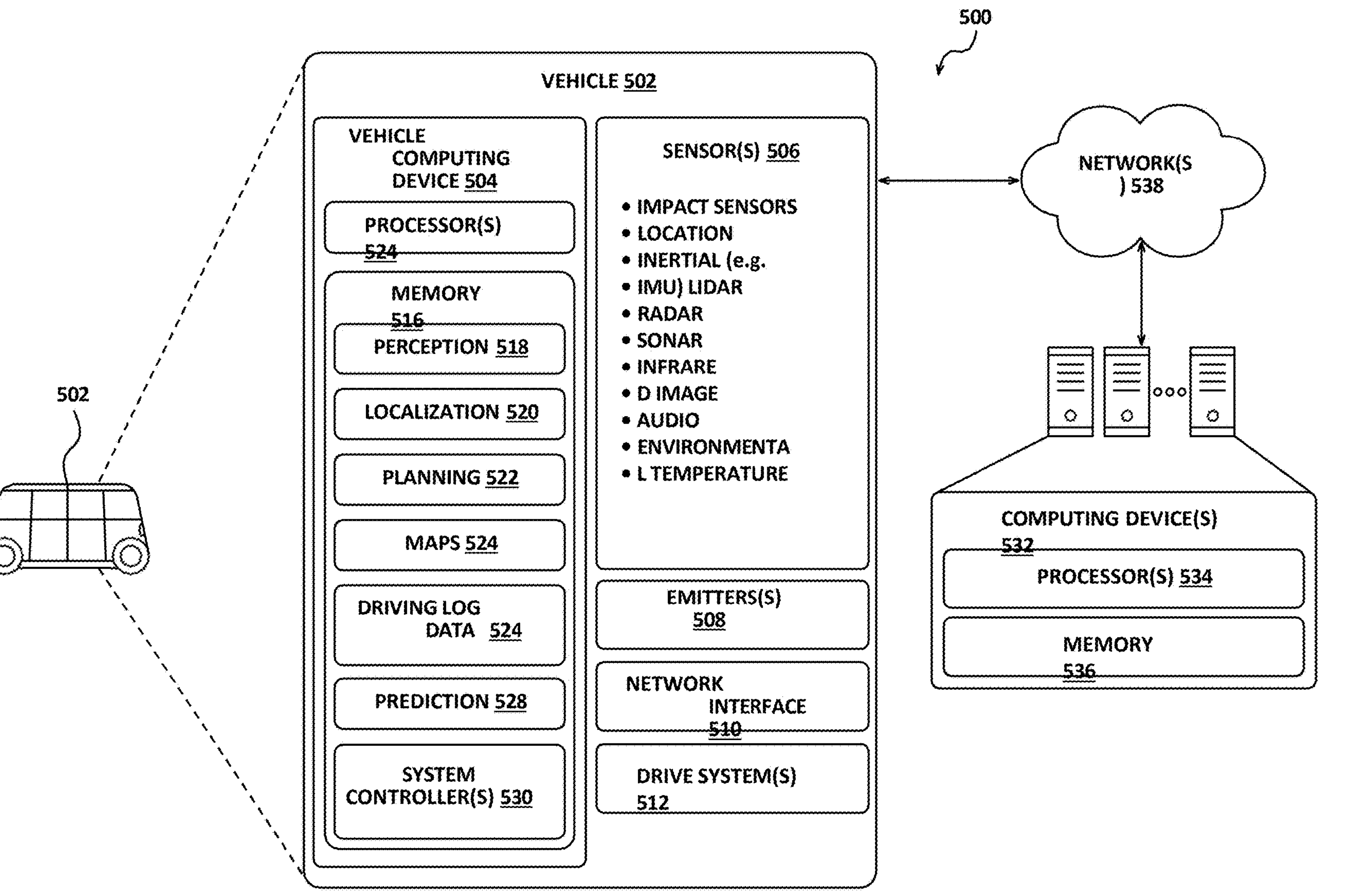
FIG. 5 depicts a block diagram of an example system for implementing the techniques described herein.

The system 300 may comprise one or more vehicle controller(s) 345, such as a drive component controller and or a system controller as disclosed in relation to FIG. 5. The vehicle controller 345 may be configured to control the sensor platform 10 associated with the system 300 based at least in part on the determined probability of collision, such as based on the collision probability data 313, and/or the collision severity score, such as based on the collision severity data 314, of the one or more primary trajectories. In one or more examples, the vehicle controller may be configured to communicate with the collision probability determiner 346 and/or the collision severity determiner 347 to obtain the collision probability data 512B and/or the collision severity data 314. In one or more examples, the vehicle controller 345 may be configured to control the sensor platform 10 to execute the primary trajectory out of the set of primary trajectories having the lowest probability of collision. In one or more examples, the vehicle controller 345 may be configured to control the sensor platform to execute the primary trajectory out of the set of primary trajectories having the lowest severity score. In one or more examples, the vehicle controller may be configured to control the sensor platform to proceed along a currently selected trajectory, such as along the nominal trajectory, for another processing instant, such as another tick, as long as at least one of the secondary areas in the set of secondary areas associated with a contingent trajectory, is free from objects.

Figure 4:
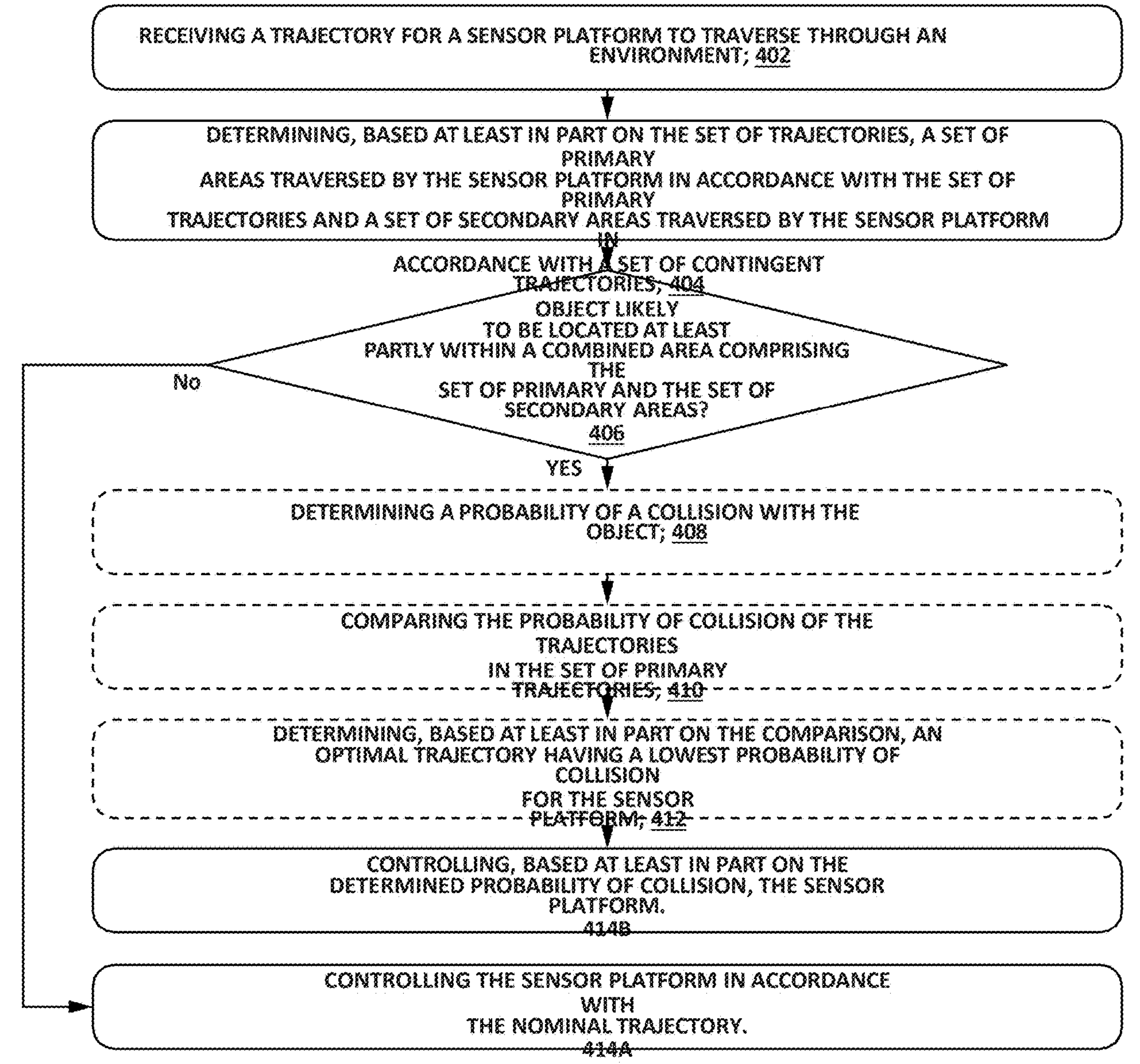
FIG. 4 is an example process of determining a trajectory to travers for a vehicle.

FIG. 4 depicts a flow chart of a method 400 for collision avoidance according to the current disclosure. The method comprises receiving 402 a set of primary trajectories, for the sensor platform to traverse through an environment. The sensor platform may be the vehicle 10, such as an autonomous vehicle, or a driver-controlled vehicle. In one or more examples, the set of primary trajectories may comprise one or more primary trajectories, such as a first primary trajectory and a second primary trajectory, and a third primary trajectory, etc.

The method comprises determining 404, based at least in part on the set of primary trajectories, a set of primary areas traversed by the sensor platform in accordance with the set of primary trajectories and a set of secondary areas traversed by the sensor platform in accordance with a set of contingent trajectories. The set of primary trajectories may comprise one or more primary trajectories. Correspondingly, the set of contingent trajectories may comprise one or more contingent trajectories. Each of the contingent trajectories may correspond to a respective primary trajectory of the set of primary trajectories, when executed at a later time. The primary area traversed by the sensor platform may correspond to an area swept by the sensor platform while traversing a given primary trajectory. In one or more examples, a respective primary area may be determined for each of the one or more trajectories in the set of primary trajectories, such as a first primary area for the first primary trajectory, a second primary area for the second primary trajectory, and a third primary area for the third primary trajectory. Correspondingly, a respective secondary area may be determined for the respective contingent trajectories in the set of contingent trajectories, such as a first secondary area for the first contingent trajectory, a second secondary area for the second contingent trajectory, and a third secondary area for the third contingent trajectory. Determining the one or more primary area(s) and/or secondary area(s) may be provided by any example component disclosed herein, such as by the traversed area determiner 342 introduced in FIG. 3.

The method comprises determining 406, based at least in part on a sensor associated with the sensor platform, whether an object is likely to be located at least partly within a combined area comprising the set of primary areas and the set of secondary areas. Determining that an object is located at least partly within the combined area comprising the primary and secondary area may be provided by any example component disclosed herein, such as by any of the sensors and/or the object determiner introduced in FIG. 3, such as by one or more of the lidar, radar, or image sensor.

The method comprises determining 408, based at least in part on an object being determined to be likely to be located at least partly within the combined area, a probability of a collision with the object. Determining the probability of a collision with the object may be provided by any example component disclosed herein, such as by the collision probability determiner introduced in FIG. 3.

In one or more examples, the method further comprises comparing 410 the probability of collision of the trajectories in the set of primary trajectories. Comparing the probability of a collision of the primary trajectories may be provided by any example component disclosed herein, such as by the collision probability determiner introduced in FIG. 3.

In one or more examples, the method comprises determining 412, based at least on the comparison, an optimal trajectory having a lowest probability of collision for the sensor platform. In one or more examples, determining the optimal trajectory comprises determining the trajectory out of the set of primary trajectories that has a zero probability of collision, such as a trajectory out of the set of primary trajectories that avoids a collision. In one or more example methods, such as upon determining that all of the trajectories of the set of primary trajectories have a probability of collision equal to or greater than a threshold probability, determining the optimal trajectory comprises determining a collision severity score for the trajectories of the set of primary trajectories, wherein the optimal trajectory may be the trajectory having the lowest collision severity score. Determining the optimal trajectory may be provided by any example component disclosed herein, such as by the collision probability determiner and/or the collision probability comparer introduced in FIG. 3. The collision severity score may be determined by analyzing an outcome of selecting the respective trajectories in the set of primary trajectories based on a set of key factors, such as injury severity, property damage, collision speed, number of involved parties, environment (such as weather conditions, road quality, visibility, and lighting at the time of the collision), type of collision (such as rear-end, head-on, side-impact, rollover, etc., being associated with different severity levels), post collision response time, etc. The collision severity score may be determined by assigning weightings to the different key factors based on its contribution to the collision severity, and optionally calculating the score based the weighted key factors using a mathematical formula, for example by using a weighted linear scoring formula.

The method comprises controlling 414, based at least in part on whether an object is determined to be likely to be located at least partly within the combined area, the sensor platform. Controlling the sensor platform may be provided by any example component disclosed herein, such as by the vehicle controller introduced in FIG. 3.

In one or more example methods, such as upon an object being determined to be unlikely to be located at least partly within the combined area, the method comprises controlling 414A the sensor platform in accordance with the nominal trajectory. The sensor platform may be controlled to proceed in accordance with the nominal trajectory for another processing instant, such as another tick, of the sensor platform. In other words, when it has been determined that an object is unlikely to be located at least partly within the combined area, such as when there is no risk that the object is located in or will move into the combined area, the In one or more example methods, controlling 414 the sensor platform comprises controlling 414B the sensor platform based at least in part on the determined probability of collision. In one or more examples, controlling the sensor platform comprises executing the primary trajectory having the lowest probability of collision. In one or more examples, controlling the sensor platform comprises executing the primary trajectory having the lowest collision severity score. Controlling the sensor platform may be provided by any example component disclosed herein, such as by the vehicle controller introduced in FIG. 3.

In one or more examples, controlling the sensor platform comprises, upon determining that an object is likely to be, at least partly, in each of the primary areas and/or the secondary areas, decelerating the sensor platform at a maximum deceleration.

FIG. 5 illustrates a block diagram of an example system 500 that implements the techniques discussed herein. FIG. 5 may represent the collision avoidance system 300 of FIG. 3. In some instances, the example system 500 may include a vehicle 502, which may represent the sensor platform 10 in FIG. 1. In some instances, the vehicle 502 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being exposed to control the vehicle at any time. However, in other examples, the vehicle 502 may be a fully or partially autonomous vehicle having any other level or classification. Moreover, in some instances, the techniques described herein may be useable by non-autonomous vehicles as well.

The vehicle 502 may include a vehicle computing device(s) 504, sensor(s) 506 (such as the sensor(s) 506 in FIG. 5), emitter(s) 508, network interface(s) 510, and/or drive system(s) 512. The system 500 may additionally or alternatively comprise computing device(s) 532.

In some instances, the sensor(s) 506 may include LIDAR sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 506 may include multiple instances of each of these or other types of sensors. For instance, the radar sensors may include individual radar sensors located at the corners, front, back, sides, and/or top of the vehicle 502. As another example, the cameras may include multiple cameras disposed at various locations about the exterior and/or interior of the vehicle 502. The sensor(s) 506 may provide input to the vehicle computing device(s) 504 and/or to computing device(s) 532.

The vehicle 502 may also include emitter(s) 508 for emitting light and/or sound, as described above. The emitter(s) 508 may include interior audio and visual emitter(s) to communicate with passengers of the vehicle 502. Interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 508 may also include exterior emitter(s). Exterior emitter(s) may include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 502 may also include network interface(s) 510 that enable communication between the vehicle 502 and one or more other local or remote computing device(s). The network interface(s) 510 may facilitate communication with other local computing device(s) on the vehicle 502 and/or the drive component(s) 512. The network interface(s) 510 may additionally or alternatively allow the vehicle to communicate with other nearby computing device(s) (e.g., other nearby vehicles, traffic signals, etc.). The network interface(s) 510 may additionally or alternatively enable the vehicle 502 to communicate with computing device(s) 532 over a network 538. In some examples, computing device(s) 532 may comprise one or more nodes of a distributed computing system (e.g., a cloud computing architecture).

The vehicle 502 may include one or more drive components 512. In some instances, the vehicle 502 may have a single drive component 512. In some instances, the drive component(s) 512 may include one or more sensors to detect conditions of the drive component(s) 512 and/or the surroundings of the vehicle 502. By way of example and not limitation, the sensor(s) of the drive component(s) 512 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 512. In some cases, the sensor(s) on the drive component(s) 512 may overlap or supplement corresponding systems of the vehicle 502 (e.g., sensor(s) 506).

The drive component(s) 512 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, such as the springs 110-140 and the accumulator 150 in FIG. 1, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 912 may include a drive component controller which may receive and pre-process data from the sensor(s) and to control operation of the various vehicle systems, such as the suspension system 10. In some instances, the drive component controller may include one or more processors and memory communicatively coupled with the one or more processors. The memory may store one or more components to perform various functionalities of the drive component(s) 512. Furthermore, the drive component(s) 512 may also include one or more communication connection(s) that enable communication by the respective drive component with one or more other local or remote computing device(s).

The vehicle computing device(s) 504 may include processor(s) 514 and memory 516 communicatively coupled with the one or more processors 514. Computing device(s) 532 may also include processor(s) 534, and/or memory 536. The processor(s) 514 and/or 534 may be any suitable processor capable of executing instructions to process data and perform operations as described herein. By way of example and not limitation, the processor(s) 514 and/or 534 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 516 and/or 536 may be examples of non-transitory computer-readable media. The memory 516 and/or 536 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), non-volatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 516 and/or memory 536 may store a perception component 518, localization component 520, planning component 522, map(s) 524, driving log data 526, prediction component 528, and/or system controller(s) 530—zero or more portions of any of which may be hardware, such as GPU(s), CPU(s), and/or other processing units.

The perception component 518 may detect object(s) in an environment surrounding the vehicle 502 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 518 is referred to as perception data. The perception component 518 may be configured to associate a bounding region (or other indication) with an identified object. The perception component 518 may be configured to associate a confidence score associated with a classification of the identified object with an identified object. In some examples, objects, when rendered via a display, can be colored based on their perceived class. The object classifications determined by the perception component 518 may distinguish between different object types such as, for example, a passenger vehicle, a pedestrian, a bicyclist, motorist, a delivery truck, a semi-truck, traffic signage, and/or the like.

In at least one example, the localization component 520 may include hardware and/or software to receive data from the sensor(s) 506 to determine a position, velocity, and/or orientation of the vehicle 502 (e.g., one or more of an x-, y-, z-position, roll, pitch, or yaw). For example, the localization component 520 may include and/or request/receive map(s) 524 of an environment and can continuously determine a location, velocity, and/or orientation of the autonomous vehicle 502 within the map(s) 524. In some instances, the localization component 520 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 520 may provide data to various components of the vehicle 502 to determine an initial position of an autonomous vehicle for generating a trajectory and/or for generating map data, as discussed herein. In some examples, localization component 520 may provide, to the perception component 518, a location and/or orientation of the vehicle 502 relative to the environment and/or sensor data associated therewith.

The planning component 522 may receive a location and/or orientation of the vehicle 502 from the localization component 520 and/or perception data from the perception component 518 and may determine instructions for controlling operation of the vehicle 502 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 530 and/or drive component(s) 512 may parse/cause to be carried out, second instructions for the emitter(s) 508 may be formatted according to a second format associated therewith).

The driving log data 526 may comprise sensor data, perception data, and/or scenario labels collected/determined by the vehicle 502 (e.g., by the perception component 518), as well as any other message generated and or sent by the vehicle 502 during operation including, but not limited to, control messages, error messages, etc. In some examples, the vehicle 502 may transmit the driving log data 526 to the computing device(s) 532.

The prediction component 528 may generate one or more probability maps representing prediction probabilities of possible locations of one or more objects in an environment. For example, the prediction component 528 may generate one or more probability maps for vehicles, pedestrians, animals, and the like within a threshold distance from the vehicle 502. In some examples, the prediction component 528 may measure a track of an object and generate a discretized prediction probability map, a heat map, a probability distribution, a discretized probability distribution, and/or a trajectory for the object based on observed and predicted behavior. In some examples, the one or more probability maps may represent an intent of the one or more objects in the environment. In some examples, the planner component 522 may be communicatively coupled to the prediction component 528 to generate predicted trajectories of objects in an environment. For example, the prediction component 528 may generate one or more predicted trajectories for objects within a threshold distance from the vehicle 502. In some examples, the prediction component 528 may measure a trace of an object and generate a trajectory for the object based on observed and predicted behavior. Although prediction component 528 is shown on a vehicle 502 in this example, the prediction component 528 may also be provided elsewhere, such as in a remote computing device. In some examples, a prediction component may be provided at both a vehicle and a remote computing device. These components may be configured to operate according to the same or a similar algorithm.

The memory 516 and/or 536 may additionally or alternatively store a mapping system, a planning system, a ride management system, etc. Although perception component 518 and/or planning component 522 are illustrated as being stored in memory 516, perception component 518 and/or planning component 522 may include processor-executable instructions, machine-learned model(s) (e.g., a neural network), and/or hardware.

As described herein, the localization component 520, the perception component 518, the planning component 522, and/or other components of the system 500 may comprise one or more ML models. For example, the localization component 520, the perception component 518, and/or the planning component 522 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD)), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SECOND, top-down feature layers (e.g., see U.S. patent application Ser. No. 15/963,833, which is incorporated by reference in its entirety herein for all purposes), and/or VoxelNet. Architecture latency optimizations may include MobilenetV2, Shufflenet, Channelnet, Peleenet, and/or the like. The ML model may comprise a residual block such as Pixor, in some examples.

Memory 520 may additionally or alternatively store one or more system controller(s) 530, which may be configured to control steering, propulsion, braking, safety, emitters, communication, and other systems of the vehicle 502. These system controller(s) 530 may communicate with and/or control corresponding systems of the drive component(s) 512 and/or other components of the vehicle 502.

It should be noted that while FIG. 5 is illustrated as a distributed system, in alternative examples, components of the vehicle 502 may be associated with the computing device(s) 532 and/or components of the computing device(s) 532 may be associated with the vehicle 502. That is, the vehicle 502 may perform one or more of the functions associated with the computing device(s) 532, and vice versa.

EXAMPLE CLAUSES

Example A: A system comprising
one or more processors; and
one or more non-transitory computer-readable media storing instructions executable by the one or more processors, wherein the instructions, when executed, cause the system to perform operations comprising:
receiving a primary trajectory for an autonomous vehicle to traverse through an environment;
determining, based at least in part on the primary trajectory, a contingent trajectory;
determining, based at least in part on the primary trajectory, a primary area defined as an area swept by the autonomous vehicle operating in accordance with the trajectory;
determining, based at least in part on the contingent trajectory, a secondary area defined as an area swept by the autonomous vehicle operating in accordance with the contingent trajectory;
determining a combined area comprising the primary area and the secondary area;
determining, based at least in part on environment data received from a sensor associated with the autonomous vehicle and as a first collision detection, that an object is likely to be at least partly located within the combined area;

determining, based at least on the first collision detection and as a second collision detection, whether the object is in the primary area; and determining, based at least in part on the first and second collision detections, to control the autonomous vehicle based on the primary trajectory or the contingent trajectory.

Example B: The system of example A, wherein the primary trajectory is associated with taking an action at a current time and the contingent trajectory is associated with taking an action at a future time after the current time.

Example C: The system of example A or B, wherein the primary trajectory is a first primary trajectory and wherein the operations further comprise:

receiving a second primary trajectory, determining that the first primary trajectory and the second primary trajectory have a probability of collision higher than a collision threshold;

determining a first collision severity score for the first primary trajectory; and determining a second collision severity score for the second primary trajectory, wherein to control the autonomous vehicle based on the primary trajectory or the contingent trajectory is further based at least in part on the first and second collision severity scores.

Example D: The system of any one of examples A to C, wherein determining to control the autonomous vehicle based on the primary trajectory or the contingent trajectory comprises:

determining whether the object is likely to be in the primary area;

executing the primary trajectory based at least in part on the primary area being free from the object.

Example E: The system of any one of examples A to D, wherein the sensor comprises one or more of an image sensor, a lidar sensor, and a radar sensor.

Example F: A method comprising, receiving a set of primary trajectories comprising a nominal trajectory for a sensor platform to traverse through an environment;

determining, based at least in part on the set of primary trajectories, a set of primary areas traversed by the sensor platform in accordance with the set of primary trajectories and a set of secondary areas traversed by the sensor platform in accordance with a set of contingent trajectories;

determining, based at least in part on a sensor associated with the sensor platform, whether an object is likely to be located at least partly within a combined area comprising the set of primary and the set of secondary areas;

Example G: The method of example F, wherein the method further comprises:

if the object is likely to be located at least partly within the combined area:

determining a probability of a collision with the object; and controlling, based at least in part on the determined probability of collision, the sensor platform, or if the object is unlikely to be located at least partly within the combined area, controlling the sensor platform in accordance with the nominal trajectory.

Example G: The method of example F, wherein the method further comprises:

comparing the probability of collision of the trajectories in the set of primary trajectories; and determining, based at least on the comparison, an optimal trajectory having a lowest probability of collision for the sensor platform, wherein controlling the sensor platform is further based at least in part on the lowest probability of collision.

Example H: The method of example G, wherein determining the optimal trajectory comprises:

determining the trajectory out of the set of primary trajectories having a zero probability of collision.

Example I: The method of example G or H, wherein determining the optimal trajectory comprises:

determining that each of the trajectories in the set of primary trajectories have a probability of collision equal to or greater than a threshold probability:

determining a collision severity score for each of the primary trajectories; and executing the primary trajectory having the lowest collision severity score.

Example J: The method of any of examples F to I, wherein the method comprises:

determining a first object in the primary area;

determining a second object in the secondary area; and controlling the sensor platform to decelerate at a maximum deceleration.

Example K: The method of any of examples F to J, wherein the contingent trajectory is one or more of:

a maximum deceleration, a left swerve, a right swerve, or the primary trajectory executed at a later point in time.

Example L: The method of any of examples F to K, wherein the contingent trajectory is executed after the current time.

Example M: One or more non-transitory computer-readable media storing instructions executable by one or more processors, wherein the instructions, when executed, cause the one or more processors to perform operations comprising:

receiving a set of primary trajectories comprising a nominal trajectory for a sensor platform to traverse through an environment;

determining, based at least in part on the set of primary trajectories, a set of primary areas traversed by the sensor platform in accordance with the set of primary trajectories and a set of secondary areas traversed by the sensor platform in accordance with a set of contingent trajectories;

determining, based at least in part on a sensor associated with the sensor platform, whether an object is likely to be located at least partly within a combined area comprising the set of primary and the set of secondary areas;

if the object is likely to be located at least partly within the combined area:

determining a probability of a collision with the object; and controlling, based at least in part on the determined probability of collision, the sensor platform, or if the object is unlikely to be located at least partly within the combined area, controlling the sensor platform in accordance with the nominal trajectory.

Example N: The one or more non-transitory computer-readable media of example M, wherein the instructions, when executed, cause the one or more processors to perform operations comprising:

comparing the probability of collision of the trajectories in the set of primary trajectories; and determining, based at least on the comparison, an optimal trajectory having a lowest probability of collision for the sensor platform, wherein controlling the sensor platform is further based at least in part on the lowest probability of collision.

Example O: The one or more non-transitory computer-readable media of any one of examples M to N, wherein determining the optimal trajectory comprises:

determining the trajectory out of the set of primary trajectories having a zero probability of collision.

Example P: The one or more non-transitory computer-readable media of any one of examples M to O, wherein determining the optimal trajectory comprises:

each of the trajectories in the set of primary trajectories have a probability of collision equal to or greater than a threshold probability;

determining a collision severity score for the each of the primary trajectories; and executing the trajectory having the lowest collision severity score.

Example Q: The one or more non-transitory computer-readable media of any one of examples M to P, wherein the instructions, when executed, cause the one or more processors to perform operations comprising:

determining a first object in the primary area;

determining a second object in the secondary area; and controlling the sensor platform to decelerate at a maximum deceleration.

While the example clauses described above are described with respect to one particular implementation, it should be understood that, in the context of this document, the content of the example clauses can also be implemented via a method, device, system, computer-readable medium, and/or another implementation. Additionally, any of examples A-S may be implemented alone or in combination with any other one or more of the examples A-S.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into subcomputations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow charts, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising one or more processors; and one or more non-transitory computer-readable media storing instructions executable by the one or more processors, wherein the instructions, when executed, cause the system to perform operations comprising:

receiving a primary trajectory for an autonomous vehicle to traverse through an environment;

determining, based at least in part on the primary trajectory, a contingent trajectory;

determining, based at least in part on the primary trajectory, a primary area defined as an area swept by the autonomous vehicle operating in accordance with the primary trajectory;

determining, based at least in part on the contingent trajectory, a secondary area defined by an area swept by the autonomous vehicle operating in accordance with the contingent trajectory;

determining a combined area comprising the primary area and the secondary area;

determining, based at least in part on environment data received from a sensor associated with the autonomous vehicle and as a first collision detection, that an object is likely to be at least partly located within the combined area;

determining, based at least on the first collision detection and as a second collision detection, whether the object is in the primary area; and determining, based at least in part on the first and second collision detections, to control the autonomous vehicle based on the primary trajectory or the contingent trajectory.

2. The system of claim 1, wherein the primary trajectory is associated with taking an action at a current time and the contingent trajectory is associated with taking the action at a future time after the current time.

3. The system of claim 2, wherein the primary trajectory is a first primary trajectory and wherein the operations further comprise:

receiving a second primary trajectory, determining that the first primary trajectory and the second primary trajectory have a probability of collision higher than a collision threshold;

determining a first collision severity score for the first primary trajectory; and determining a second collision severity score for the second primary trajectory, wherein to control the autonomous vehicle based on the primary trajectory or the contingent trajectory is further based at least in part on the first and second collision severity scores.

4. The system of claim 1, wherein determining to control the autonomous vehicle based on the primary trajectory or the contingent trajectory comprises:

determining whether the object is likely to be in the primary area;

executing the primary trajectory based at least in part on the primary area being free from the object.

5. The system of claim 1, wherein the sensor comprises one or more of an image sensor, a lidar sensor, and a radar sensor.

6. A method comprising:

receiving a set of primary trajectories comprising a nominal trajectory for a sensor platform to traverse through an environment;

determining, based at least in part on the set of primary trajectories, a set of primary areas traversed by the sensor platform in accordance with the set of primary trajectories and a set of secondary areas traversed by the sensor platform in accordance with a set of contingent trajectories;

determining, based at least in part on a sensor associated with the sensor platform, whether an object is likely to be located at least partly within a combined area comprising the set of primary and the set of secondary areas;

if the object is likely to be located at least partly within the combined area:

determining a probability of a collision with the object; and controlling, based at least in part on the determined probability of collision, the sensor platform, or if the object is unlikely to be located at least partly within the combined area, controlling the sensor platform in accordance with the nominal trajectory.

7. The method of claim 6, wherein the method further comprises:

comparing the probability of collision of the trajectories in the set of primary trajectories; and determining, based at least on the comparison, an optimal trajectory having a lowest probability of collision for the sensor platform, wherein controlling the sensor platform is further based at least in part on the lowest probability of collision.

8. The method of claim 7, wherein determining the optimal trajectory comprises:

determining the trajectory out of the set of primary trajectories having a zero probability of collision.

9. The method of claim 8, wherein determining the optimal trajectory comprises:

determining that each of the trajectories in the set of primary trajectories have a probability of collision equal to or greater than a threshold probability;

determining a collision severity score for each of the primary trajectories; and executing the primary trajectory having the lowest collision severity score.

10. The method of claim 6, wherein the method comprises:

determining a first object in a primary area of the set of primary areas;

determining a second object in a secondary area of the set of secondary areas; and controlling the sensor platform to decelerate at a maximum deceleration.

11. The method of claim 6, wherein the contingent trajectory is one or more of:

a maximum deceleration, a left swerve, a right swerve, or the primary trajectory executed at a later point in time.

12. The method of claim 6, wherein the contingent trajectory is executed after the current time.

13. One or more non-transitory computer-readable media storing instructions executable by one or more processors, wherein the instructions, when executed, cause the one or more processors to perform operations comprising:

receiving a set of primary trajectories comprising a nominal trajectory for a sensor platform to traverse through an environment;

determining, based at least in part on the set of primary trajectories, a set of primary areas traversed by the sensor platform in accordance with the set of primary trajectories and a set of secondary areas traversed by the sensor platform in accordance with a set of contingent trajectories;

determining, based at least in part on a sensor associated with the sensor platform, whether an object is likely to be located at least partly within a combined area comprising the set of primary and the set of secondary areas;

if the object is likely to be located at least partly within the combined area:

determining a probability of a collision with the object; and controlling, based at least in part on the determined probability of collision, the sensor platform, or if the object is unlikely to be located at least partly within the combined area, controlling the sensor platform in accordance with the nominal trajectory.

14. The one or more non-transitory computer-readable media of claim 13, wherein the instructions, when executed, cause the one or more processors to perform operations comprising:

comparing the probability of collision of the trajectories in the set of primary trajectories; and determining, based at least on the comparison, an optimal trajectory having a lowest probability of collision for the sensor platform, wherein controlling the sensor platform is further based at least in part on the lowest probability of collision.

15. The one or more non-transitory computer-readable media of claim 14, wherein determining the optimal trajectory comprises:

determining the trajectory out of the set of primary trajectories having a zero probability of collision.

16. The one or more non-transitory computer-readable media of claim 14, wherein determining the optimal trajectory comprises:

determining that each of the trajectories in the set of primary trajectories have a probability of collision equal to or greater than a threshold probability;

determining a collision severity score for each of the primary trajectories; and executing the trajectory having the lowest collision severity score.

17. The one or more non-transitory computer-readable media of claim 15, wherein the instructions, when executed, cause the one or more processors to perform operations comprising:

determining a first object in a primary area of the set of primary areas;

determining a second object in a secondary area of the set of secondary areas; and controlling the sensor platform to decelerate at a maximum deceleration.

* * * * *